April 15, 1958  ALBRECHT-WOLF MANTZEL  2,830,826
ELASTIC WHEEL SUSPENSIONS FOR VEHICLES
Filed July 12, 1954  2 Sheets-Sheet 1
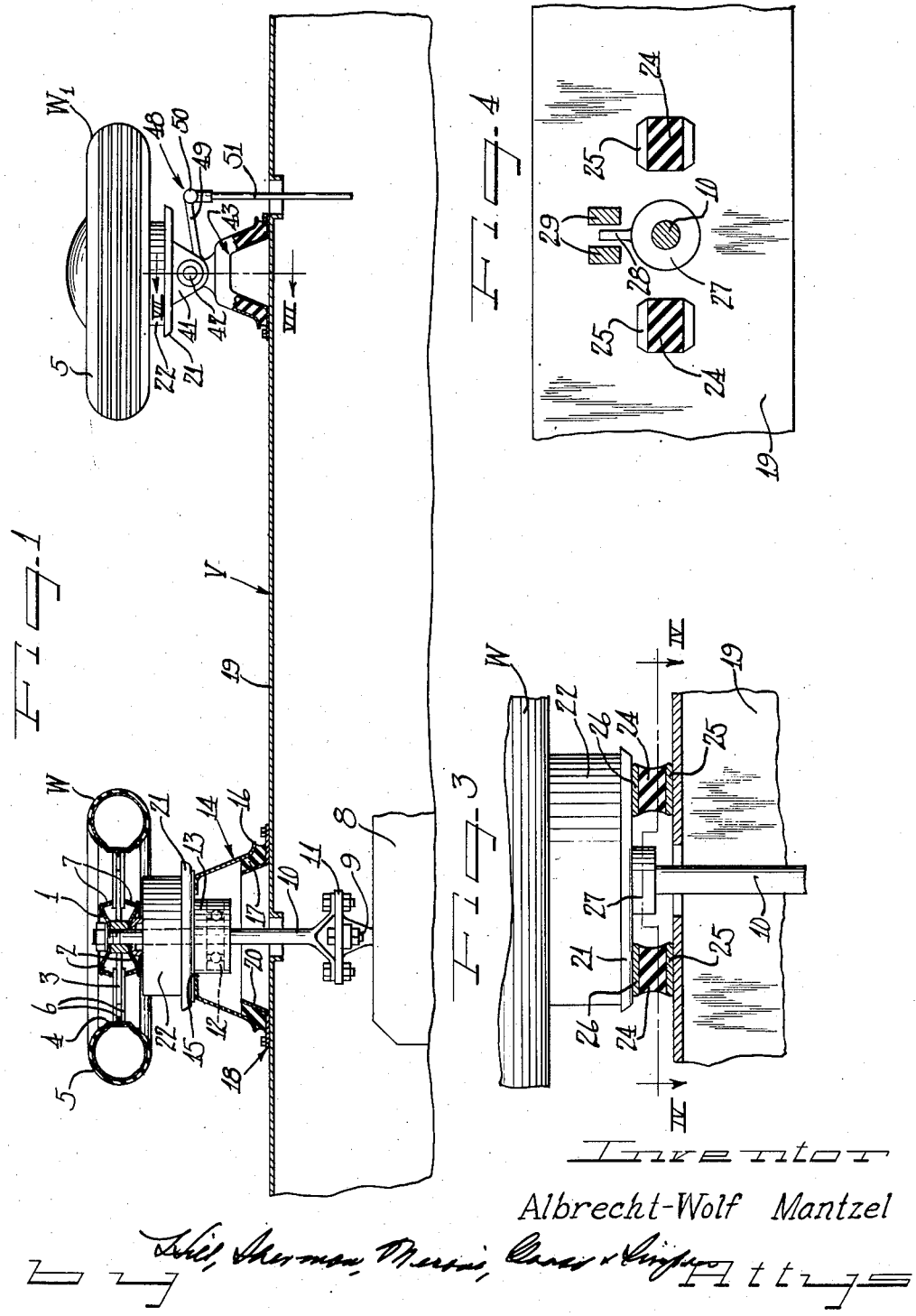
Inventor
Albrecht-Wolf Mantzel

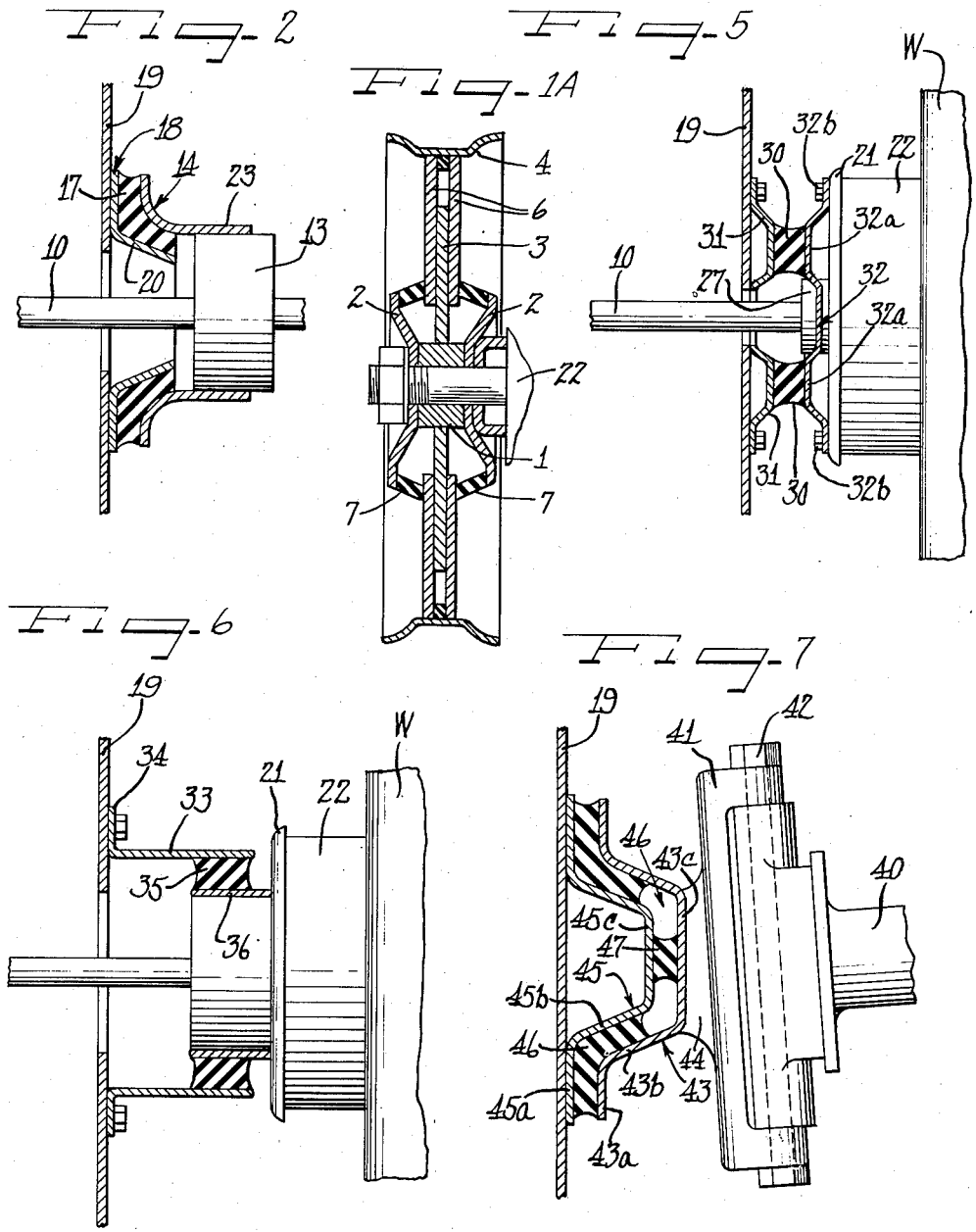

United States Patent Office 2,830,826
Patented Apr. 15, 1958

2,830,826

ELASTIC WHEEL SUSPENSIONS FOR VEHICLES

Albrecht-Wolf Mantzel, Stuttgart, Mohringen, Germany, assignor, by mesne assignments, to Rand-Goetze Corporation, Cleveland, Ohio, a corporation of Ohio Application July 12, 1954, Serial No. 442,673

4 Claims. (Cl. 280—96.2)

This invention relates to wheel suspensions for vehicles such as automobiles, motorcycles, and the like, and specifically deals with elastic vehicle wheel suspensions including wheels having rubber sprung hubs wherein the hubs are carried by elastic supports capable of dampening out vibrations and preventing development of a resonance peak.

In vehicles mounted on spring wheels of the type having elastically supported hubs, and especially in two-wheeled motorcycles as well as in motorcars with three or four wheels, it has been found that vibrations are transmitted from the wheel to the vehicle body in amounts depending on road conditions and on the speed of the vehicle when the hubs of the wheels were not spring mounted relative to the vehicle body. In general, such vibrations were not troublesome but, in some instances, a resonance peak developed to interfere with smooth operation of the vehicle. Resonance peaks will vary with individual vehicles and speeds of operation since they are dependent upon the elastic mass of the wheels and the weight of the vehicle.

In accordance with the present invention, vibrations developed by spring wheels are dampened out or destroyed by elastically mounting at least one of the wheel axles on the vehicle body so as to accommodate relatively small independent movements of the axle. In motorcycles, it is advisable to suspend the driven axle elastically in accordance with this invention. In motorcars with rear end drives, it is desirable to elastically suspend the rear axle. Suitable elastic suspensions include rubber pads bonded to metal parts. These pads are chosen so as to produce a gradually rising load deflection curve for the wheel axle.

In accordance with this invention, the idle running wheels of a vehicle such as the front wheels, can also be elastically mounted on the vehicle body and in such installations, it is desirable to design the front and rear mountings so as to have different load deflection curves to thereby effectively destroy any common vibrations.

It is then an object of this invention to provide a vehicle supported on spring wheels with elastic axle supports for the wheels to dampen out vibrations that might otherwise be transmitted from the wheel hubs to the vehicle body.

A further object of the invention is to provide an elastic swing axle mounting for vehicles.

A still further object of the invention is to provide a spring suspension for vehicles including wheels with elastic sprung hubs carried on elastic supported axles.

A still further object of the invention is to combine rubber supported wheel hubs with rubber mounted axles carrying said hubs to dampen out vibrations between the wheels and body of a vehicle.

A still further object of this invention is to provide a rubber swing axle suspension especially suitable for spring wheels.

Other and further objects of the invention will be apparent to those skilled in the art from the following detailed description of the annexed sheets of drawings, which, by way of preferred examples only, illustrate several embodiments of the invention.

On the drawings:

Figure 1 is a plan view of the left side of a motorcar equipped with rubber suspensions of this invention and showing parts in horizontal cross-section to illustrate underlying parts.

Figure 1A is a fragmentary enlarged view of the rear wheel of Figure 1.

Figure 2 is a cross-sectional view, with parts in elevation, showing a slightly modified axle mounting for the rear wheel.

Figure 3 is a plan view, with parts in horizontal cross-section, of a further modified swing axle mounting.

Figure 4 is a cross-sectional view, with parts in elevation, taken along the line IV—IV of Figure 3.

Figure 5 is a view similar to Figure 3 but illustrating a further modification.

Figure 6 is a cross-sectional view, with parts in elevation, of a still further modified axle suspension.

Figure 7 is a vertical cross-sectional view taken substantially along the line VII—VII of Figure 1.

As shown on the drawings:

In Figure 1, the vehicle V is in the form of a rear drive four-wheeled motorcar including driven rear wheels such as W and free-running or idle front wheels such as $W_1$. The wheels W and $W_1$ are of the type having elastically sprung hubs supported by rim parts which are radially and circumferentially displaceable relative to the hubs.

Each wheel includes a hub 1 mounted on its axle, a pair of dished metal disks 2 secured on the front and rear faces of the hub and extending radially outward therefrom, and a radially extending disk-like flange 3 between the disks 2. A rim 4 surrounds the hub 1 and supports a pneumatic tire 5. A pair of spaced parallel metal disks 6 extend inwardly from the hub to straddle the flange 3 in sliding relation and thereby laterally stabilize the rim against displacement relative to the hub. A pair of rubber rings or annular bands 7 connect the outer peripheral margins of the disks 2 with the disks 6 to elastically support the hub in the rim. These annular bands 7 have an axial length greater than their radial thickness and are maintained under compression or tension stresses when subjected to load but are relatively free from shear stresses. The outer edges of the bands are bonded as by vulcanizing to the disks 2 while the inner edges of the bands are bonded as by vulcanizing to the slide disks 6. The lateral arrangement of the rubber rings or bands 7 is such that the rings will not fold or buckle during relative displacement of the rim and hub components while accommodating relative and radial displacements. Thus, the hubs 1 are elastically supported in the rims 4 of the wheels but are held against lateral displacement relative to the rims by sliding guides.

The vehicle V is driven from an engine (not shown) through differential gearing 8 which drives an output shaft 9. A swing axle 10 according to this invention, is drivingly connected to the output axle 9 through a simple flexible disk joint 11. This joint includes a flexible ring bolted to yokes on the ends of the axle and is ample to accommodate relative movement between the axles 9 and 10 due to the relatively small degrees of swinging movement of the axle 10. Complicated universal joint structures that must be used to accommodate wider angulation are not necessary.

The axle 10 is rotatably supported by a bearing 12 carried in a housing 13 which is mounted on the inner face of a cup-shaped support 14. The cup-shaped support has an opening 15 through the outer face thereof accommodating the axle therethrough while the mouth of the cup has an outturned lip 16 bonded to a rubber body 17 carried by a housing 18 which is secured on the side of the vehicle frame 19. This housing 18 has an outturned collar 20 receiving the rubber mass 17 therearound. The rubber is thus in the form of a ring and is firmly bonded to both the base and lip of the housing 18 as well as to the lip of the housing 14.

The outer face of the housing 14 carries the brake backing plate 21 and the brake drum 22 of the wheel is fixed to the axle 8 for corotation with the wheel. Since both the brake backing plate or carrier and the axle bearings are supported from the rubber mounted cup-shaped support 14, these components will swing with the axle and wheel.

In the arrangement of Figure 2, the bearing housing 13 for the axle 10 is surrounded by a collar-like extension 23 of the housing 14 instead of being carried by an outer wall of the housing.

In the arrangement shown in Figures 3 and 4, the rubber ring 17 is replaced with a pair of rubber blocks 24 bonded to side plates 25 and 26. The plates 25 are secured to the chassis frame 19 while the plates 26 are secured to the brake backing plate 21 and the bearings for the axle can be carried inside of a housing 27 mounted on this backing plate 21. The bearing housing 27, as shown in Figure 4, can be equipped with a radial extending finger 28 positioned between stops 29 on the vehicle frame 19 so as to laterally stabilize the assembly. If desired, additional rubber pads 24 could be provided at right angular relation to the illustrated pads for absorbing the lateral deflection.

In the arrangement shown in Figure 5, rubber pads or blocks 30 are bonded on one of their faces to cup-shaped disks 31. These disks 31 are affixed to the side frame 19 of the vehicle. The outer faces of the rubber blocks 30 are affixed to raised portions 32a of a single disk 32 attached to the brake backing plate 21 alongside of the bearing housing 27 at 32b. In this arrangement, the rubber pads are disposed above and below the axle 10.

In the further modification shown in Figure 6, the side frame 19 of the vehicle V carries a sleeve 33 with an outturned flange 34 at the base thereof affixed to the frame 19 and with an open outer end receiving a rubber ring 35 therein in bonded relation. A sleeve 36 carried by the wheel hub 1 projects into the ring 35 and is bonded to the inner periphery of the ring. These two sleeves 33 and 36, therefore, connect the wheel to the frame through the rubber ring 35. If desired, this rubber ring 35 can be subdivided into segments.

The wheel $W_1$, as best shown in Figure 7, has the spindle 40 thereof carried from a kingpin knuckle 41 on a kingpin 42 as is customary. The kingpin knuckle, however, has a hat-shaped metal member 43 integrally affixed thereto with the crown 43c of the hat connected to the intermediate portion 44 of the knuckle 41 between the kingpin bearings. The vehicle frame 19 has a similar hat-shaped member 45 affixed thereon and projecting into the member 43. A mass 46 of rubber is disposed between the hat members 43 and 45 to extend between the rims 43 and 45a respectively, and to also extend between the sidewalls 43b and 45b respectively, but terminating below the crowns 43c and 45c thereof to provide an open annular hollow space 46. If additional lateral stability is desired, the rims 43a and 45a can be extended at the bottom to confine additional amounts of rubber and a block 47 of rubber can be interposed in the space 46 and bonded to the crowns 43c and 45c respectively. The hat-shaped members 43 and 45, will distribute the stresses on the elastic masses therebetween so that part of the masses will be shear stressed and part will be compressibly loaded by lateral forces between the rims. A provision of conical side walls 43b and 45b so confines the rubber as to give it a high form factor. By broadening the flanges or rims at the bottom adjacent the load, the static and dynamic stresses of the rubber will be tension stressed between these rims while the upper sections will be pressure stressed.

If desired, the housings 43 and 45 can be provided with a cruciform section instead of a circular section.

While individual axle suspensions are thus provided for the front wheels, the swinging movements of these suspensions is limited so that conventional solid axle type steering linkages such as 48, can be used. As shown in Figure 1, this linkage includes a wheel arm 49 on the spindle assembly, a tie rod joint 50 and a cross tie rod 51. The heretofore necessary idler arm, cross links, short tie rods, and increased number of joints are avoided.

From the above descriptions it will, therefore, be understood that the invention provides axle mountings for rubber sprung wheel hubs wherein the axles are elastically suspended from the vehicle body in such a manner as to dampen out vibration which might otherwise be transmitted from the wheel to the body. The elastic wheel suspensions and the elastic axle suspensions are so correlated as to prevent development of a vibration resonance peak. The elastic wheel suspension preferably has a higher load deflection curve than the elastic axle suspension so as to cushion and absorb impact, thereby lessening the impact transfer to the axle suspension. The "stiffer" axle suspension, coupled with the "softer" wheel suspension, cooperate to dampen out vibrations and prevent resonance peaks such as might occur with vehicles only having one or the other of the two suspensions.

It will be understood that variations and modifications may be effected without departing from the scope of the novel concepts of this invention.

I claim as my invention:

1. A vehicle wheel suspension comprising a vehicle body-mounted housing having an annular outturned collar, a cup-shaped housing overlying said collar, a ring of rubber between the housings in bonded relation therewith, an axle extending through the housings, and a bearing supported by the cup-shaped housing rotatably carrying said axle.

2. A vehicle wheel suspension which comprises a vehicle body-mounted ring with an outturned collar, an axle-mounted ring surrounding said collar, a rubber pad between the collar and axle-mounted ring in bonded relation therewith, a wheel hub on the axle, a wheel rim surrounding the hub, rubber rings connecting the hub and rim, and said rubber pad and rubber rings spring suspending the vehicle while dampening out vibrations between the wheel rim and vehicle body.

3. In a wheel suspension for vehicles a vehicle body-mounted collar, an axle-mounted collar surrounding the first mentioned collar, an axle bearing carried by the second mentioned collar, an axle extending through the collars and bearing, a rubber ring between the collars in bonded relation therewith, a brake backing plate on the axle-mounted collar, a brake drum adjacent said plate, and a rubber sprung wheel having the hub thereof mounted on the axle, the moments of vibration of the rubber ring and the rubber sprung wheel being different to prevent development of a resonance peak.

4. In a vehicle wheel suspension a wheel spindle, a spindle knuckle, a kingpin pivotally supporting the spindle on the knuckle, a hat-shaped housing on the knuckle having the open side thereof facing the vehicle body, a cooperating hat-shaped housing on the vehicle body, and rubber between the housings in bonded relation therewith.

(References on following page)

References Cited in the file of this patent

UNITED STATES PATENTS

| | | | |
|---|---|---|---|
| 409,362 | Kenyon | Aug. 20, | 1889 |
| 2,049,474 | Smith | Aug. 4, | 1936 |
| 2,073,617 | Armington | Mar. 16, | 1937 |
| 2,147,518 | Boxan | Feb. 14, | 1939 |
| 2,149,887 | Hickman | Mar. 7, | 1939 |
| 2,166,774 | Tjaarda | July 18, | 1939 |
| 2,254,491 | Olley | Sept. 2, | 1941 |
| 2,409,501 | Krotz | Oct. 15, | 1946 |
| 2,463,226 | Walden | Mar. 1, | 1949 |

FOREIGN PATENTS

| | | | |
|---|---|---|---|
| 1,053,995 | France | Oct. 7, | 1953 |
| 488,888 | Great Britain | July 15, | 1938 |
| 646,664 | Great Britain | Nov. 22, | 1950 |